(12) United States Patent
Davila

(10) Patent No.: US 7,797,852 B2
(45) Date of Patent: Sep. 21, 2010

(54) SUPPORT DEVICES AND KITS FOR PISTON RINGS

(76) Inventor: David Davila, 6 Lantern Way, Nesconset, NY (US) 11767

( * ) Notice: Subject to any disclaimer, the term of this patent is extended or adjusted under 35 U.S.C. 154(b) by 143 days.

(21) Appl. No.: 12/316,104

(22) Filed: Dec. 9, 2008

(65) Prior Publication Data
US 2010/0139108 A1    Jun. 10, 2010

(51) Int. Cl.
*G01D 21/00* (2006.01)
(52) U.S. Cl. ............................ 33/605; 33/611
(58) Field of Classification Search .................. 33/605, 33/611, 645; 269/289 R, 302.1
See application file for complete search history.

(56) References Cited

U.S. PATENT DOCUMENTS

| | | | | |
|---|---|---|---|---|
| 1,611,441 A | | 12/1926 | Higgins | |
| 1,865,388 A | | 6/1932 | Ralph | |
| 4,993,895 A | * | 2/1991 | Nordstrom | 269/289 R |
| 5,038,449 A | | 8/1991 | Huggins, Jr. | |
| 5,282,412 A | * | 2/1994 | Ebbing | 92/172 |
| 5,425,306 A | * | 6/1995 | Binford | 92/222 |
| 5,979,071 A | | 11/1999 | Kim | |
| 6,089,557 A | * | 7/2000 | Obrist | 269/309 |
| 6,126,159 A | * | 10/2000 | Dornfeld | 269/153 |
| 7,096,553 B1 | | 8/2006 | Carruth | |
| 7,581,722 B2 | * | 9/2009 | Garry et al. | 269/289 R |
| 2004/0217530 A1 | * | 11/2004 | Harris et al. | 269/55 |
| 2004/0256780 A1 | * | 12/2004 | Lang | 269/309 |
| 2005/0274255 A1 | | 12/2005 | Hamilton | |
| 2006/0220292 A1 | * | 10/2006 | Dahlquist | 269/309 |
| 2010/0147252 A1 | * | 6/2010 | Langner et al. | 123/193.6 |

* cited by examiner

*Primary Examiner*—G. Bradley Bennett
(74) *Attorney, Agent, or Firm*—Daniel P. Burke & Associates, PLLC

(57) ABSTRACT

A support device for a piston ring comprising a circular support defining a bore having an interior support surface to provide circumferential support to a piston ring. Also disclosed is a kit comprising a plurality of circular supports.

30 Claims, 6 Drawing Sheets

US 7,797,852 B2

SUPPORT DEVICES AND KITS FOR PISTON RINGS

The present invention is directed to a support device useful in measuring a gap in a piston ring, e.g. a piston ring of a combustion engine.

BACKGROUND OF THE INVENTION

Typically, a gap in a piston ring is measured with a feeler gauge when the piston ring is positioned on an actual engine block. Putting the piston ring into the engine block is time consuming and requires the presence of the actual engine block. It is also sometimes desirable to increase the gap in a piston ring, for example, when the engine utilizes high performance combustibles, such as nitrous oxide.

SUMMARY OF THE INVENTION

Various embodiments of the present invention are directed to support devices useful for measuring a gap in a piston ring. One embodiment comprises a base having a front section, an upper support surface, and a relieved section extending through at least a portion of the front section. A circular support defining a bore having an interior support surface is also provided. The interior support surface has two forward edges which define a front opening of the circular support. The interior support surface is also adapted to provide circumferential support to a piston ring. The circular support is releasably secured to the base such that at least a portion of the front opening overlaps a portion of the relieved section. In one preferred embodiment, a piston ring rests on the base and is circumferentially supported by a circular support which is releasably connected to the base.

Another embodiment of the present invention comprises an integrally formed base and circular support. The circular support of this embodiment defines a bore having an interior support surface to circumferentially support a piston ring. Multiple units, each having a different internal bore diameter, can be provided.

Another embodiment of the present invention is directed to a support device for measuring gaps in different size piston rings. The kit preferably comprises a base and a plurality of circular supports such that at least some supports have different bore diameters.

The present invention is designed to speed up the process of measuring the gap in a piston ring and eliminating the need to have the actual engine block present during the measurement and adjustment of the piston ring gap. Actual grinding of the piston ring for adjusting/sizing the gap in the piston ring may take place on a separate grinder.

DETAILED DESCRIPTION

FIGS. 1-5 illustrate embodiments of the present invention comprising a piston ring support device which is particularly useful for measuring the size of a gap in a piston ring without positioning the ring in an actual engine during measurement.

Figure 1:
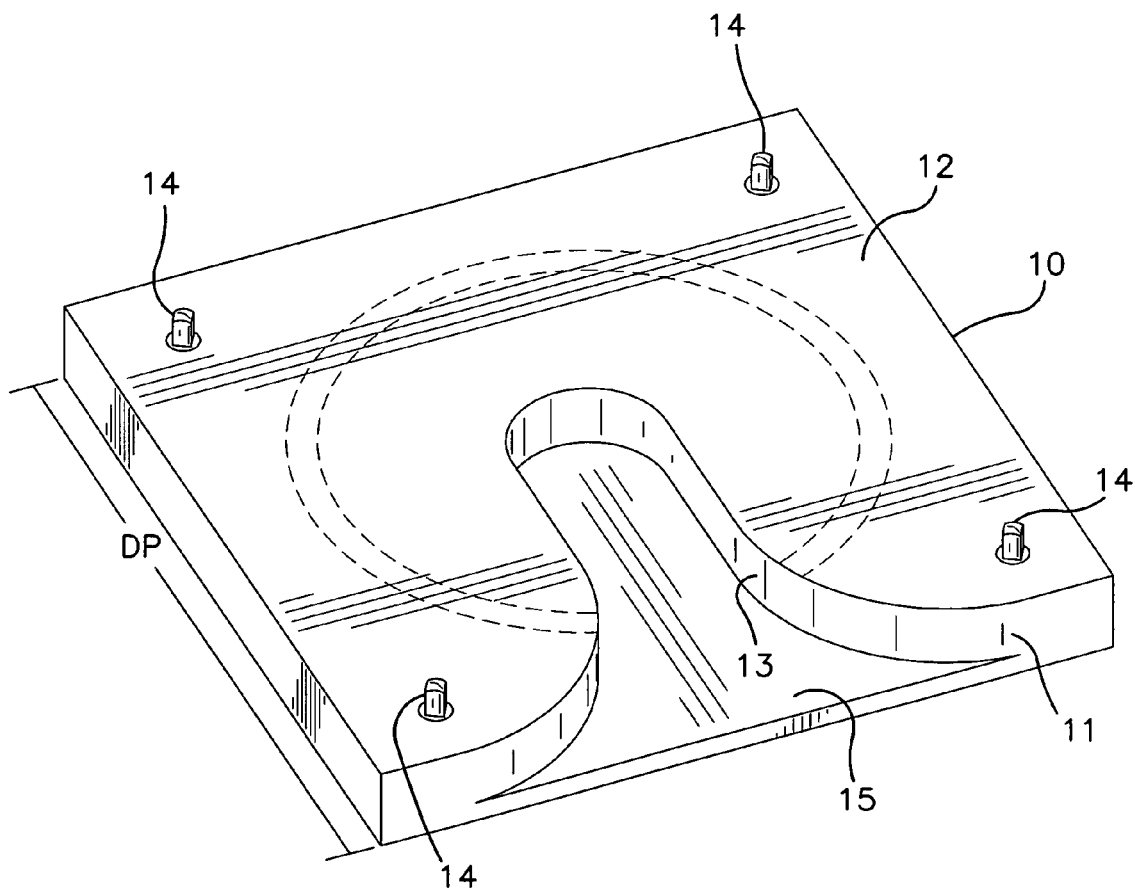
FIG. 1 is an upper, perspective view of one embodiment of a base of the present invention.
Figure 2:
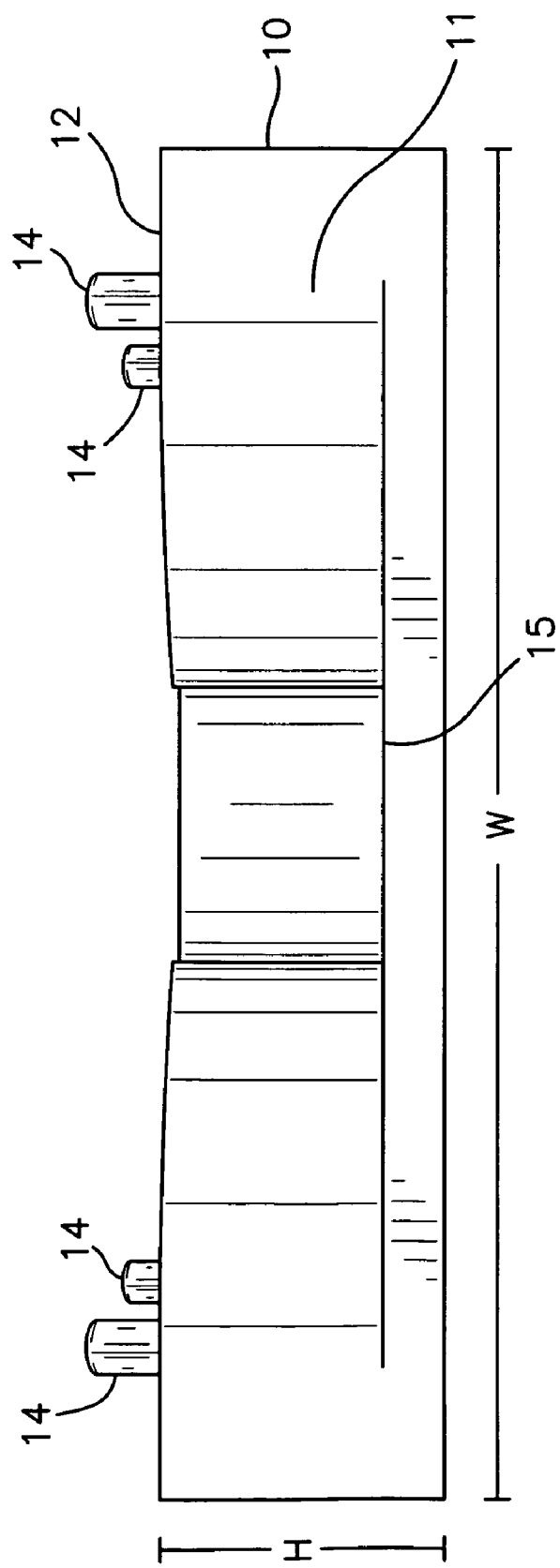
FIG. 2 is a front perspective view of the base of FIG. 1.

With reference to FIGS. 1 and 2, this embodiment comprises a base 10 and a circular support 20, sometimes referred to herein as a bore specification plate. The base 10 of this illustrated embodiment comprises a front section 11, a support surface 12, a relieved section and a base support 15. In this illustrated embodiment, support surface 12 is an upwardly facing surface and is, therefore, sometimes referred to herein as an "upper" surface. The advantages of the present invention are not limited to a device which is oriented exactly as shown in the figures. For example, the device can be oriented so that during the measuring of the gap, the piston ring is vertical or at some other angular orientation between the illustrated horizontal orientation and vertical.

The front section 11 comprises a width W as shown in FIG. 2. As used herein, the front section 11 refers to the forward portion of the base 10, not only to the front surface of the base 10. In this embodiment, a relieved section extends vertically through a portion of the base 10 and is preferably wide enough to allow a user sufficient manual access to a piston ring. The relieved section of this embodiment is defined by sidewalls 13 and top surface of support base 15 between those sidewalls 13. Preferably, there is enough room for a user to position and remove the piston ring with his thumb and forefinger. In this illustrated embodiment, the relieved section is about 1¼ in. wide. The relieved section preferably has a minimum width of about 1 inch to about 2 inches. For rings used in most automobile engines, a width of about 1¼ inches is believed to be suitable since it allows access by a user's finger while still giving support to the piston ring.

With reference to FIG. 2, base 10 also comprises a height H. The relieved section of this illustrated embodiment extends from the support surface 12 of the base 10 through a majority of the height H of the base 10. In this illustrated embodiment, the height of the sidewall 13 defining the relieved section is about 1 inch. The bottom portion of the base 10, through which the relieved section does not extend is referred to herein as the base support 15. The base support 15 is provided for strength and stability of the base 10. Alternatively, the relieved section can extend through more, or less of the height H of the base 10 or through the entire height H of the base 10.

As shown in FIG. 1, the base 10 also comprises a depth DP and the relieved section extends through a majority of the depth DP of the base 10 in this illustrated embodiment. The relieved section may extend through more or less of the depth DP of the base 10 in order to accommodate larger or smaller piston rings.

Figure 3B:
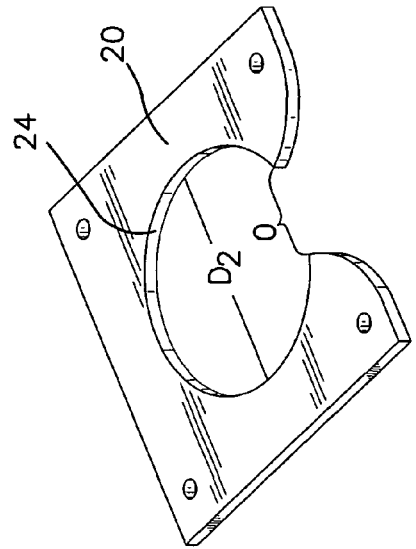
FIGS. 3A-3C are perspective views of a kit embodiment of the present invention.
Figure 3A:
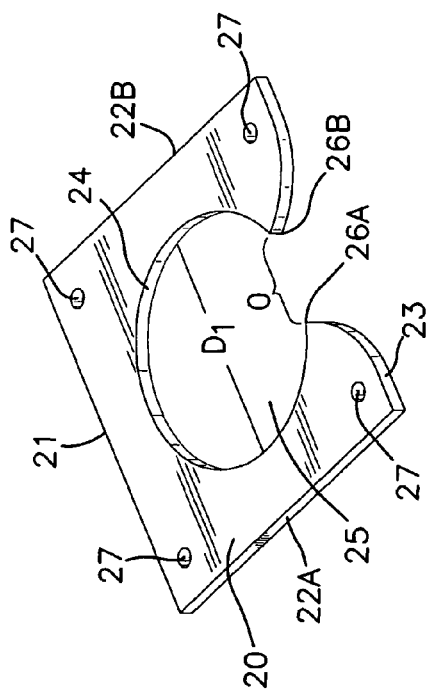

FIGS. 3A and 3B illustrate embodiments of circular supports 20. Each circular support 20 comprises a rear portion 21, two sides 22A and 22B, and a curved front portion 23. The circular support 20 further comprises an interior support surface 24 which defines a bore 25. The bores illustrated in FIGS. 3A and 3B have different internal diameters $D_1$ and $D_2$, respectively, for supporting different size piston rings. The interior support surface 24 extends circumferentially less than 360°, e.g., about 285° to about 335°, preferably about 310° to about 320°. The right and left forward edges 26A and 26B of the interior support surface 24 define a front opening O.

The diameter D of the bore 25 corresponds to the size of the internal bore of a cylinder in which the subject piston ring will be used. Ideally, the interior diameter D is the same as the engine cylinder bore diameter, within engine manufacturer tolerances. However, as explained below, it may also be possible to use circular supports having slightly different bore sizes than the intended cylinder bore. Most preferably, the circular support 20 acts as a bore specification plate since the diameter D of the bore 25 represents the interior diameter specified for the bore of an actual engine cylinder.

The interior support surface 24 provides circumferential support to the piston ring. As used herein, the term "circumferential support" is not intended to indicate that the circular support entirely surrounds the piston ring, i.e. on all 360°. However, the support device can be used to measure the gap in a piston ring even if the circular support entirely surrounds the supported piston ring, i.e. if the circular support does not have a front opening.

The front opening O is preferably wide enough to allow sufficient access to position and remove the piston ring with a user's thumb and forefinger, and/or to use a feeler gauge to measure the gap while the piston ring is supported by the support surface 12 and the interior support surface 24.

The circular support 20 preferably has a thickness about ¼ inch to about 1 inch. In these illustrated embodiments, each circular support 20 is about ¼ inch thick.

The dimensions provided herein for the illustrated embodiments are provided as examples and are not intended to be limiting. Each of the dimensions of the support device components are selected to facilitate measuring the gap in piston rings used with larger or smaller engine cylinders.

Figure 3C:
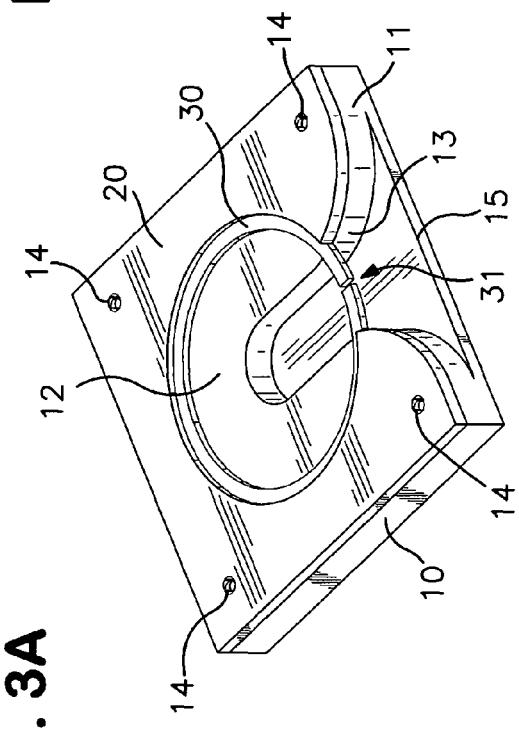

The circular support 20 may have indicia to indicate the size of the particular circular support 20. Such indicia is preferable so that a user can readily determine the appropriate circular support to use and distinguish between circular supports when multiple circular supports are provided in a kit as shown in FIGS. 3A-3C. The piston ring shown in FIG. 3C is provided for illustration purposes only and is not part of the kit.

This embodiment further comprises means for releasably securing the circular support 20 to the base 10. In the illustrated embodiment, the securing means comprises a plurality of positioning pins 14 connected to the base 10 which extend upwardly above the support surface 12 and a plurality of corresponding holes 27 in circular supports 20. The circular support 20 is positioned on the support surface 12 and each of the holes 27 align with and receive one of the corresponding positioning pins 14. In the kit embodiment illustrated in FIGS. 3A-3C, the holes 27 and the positioning pins 14 are arranged about ⅝ inch from the closest edges of the circular support and base, respectively.

In another embodiment, the securing means comprises a plurality of positioning pins connected to the base and a plurality of recesses that do not extend through the entire height of the circular support. Alternatively, the releasable securing means comprises a plurality of positioning pins connected to the circular support and a plurality of holes or recesses in the base. In yet a further embodiment, the releasable securing means comprises a plurality of holes or recesses in both the base and the circular support. In this embodiment, the base and the circular support are releasably secured by a plurality of pins or threaded connectors. The threaded connectors can include screws. In yet another embodiment, the circular support is secured to the base by fitting at least a portion of the circular support and preferably, the entire circular support, into a recess in the base. In this embodiment, the base has a recess that corresponds to the size and shape of the circular support and receives at least some, and preferably all of the circular support. The base can have raised rims around the upper surface edges which releasably secure the circular support to the base.

FIG. 3C illustrates a piston ring 30 positioned within the bore 25 and circumferentially supported by the interior support surface 24. The piston ring 30 is also supported by the support surface 12 in a generally horizontal position so that the piston ring gap 31 faces the front opening O and is readily accessible to a user. The front opening O and the relieved section are preferably in overlapping relation when the circular support 20 is releasably secured to the base 10 so that a user has access to the piston ring. In this illustrated embodiment, the right and left forward edges 26A and 26B align directly with sidewalls 13.

Figure 4:
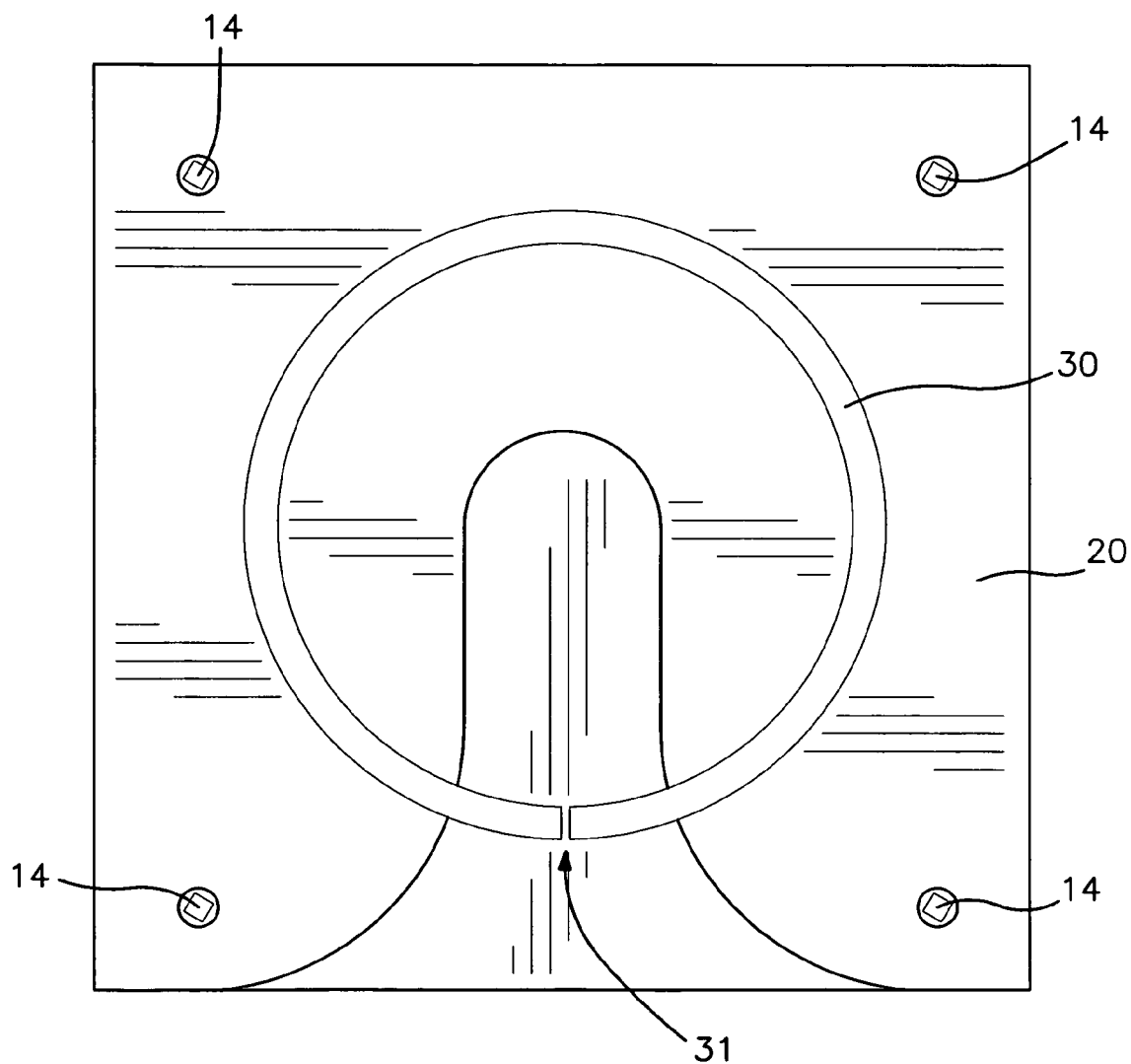
FIG. 4 is a plan view of one embodiment of the present invention with a piston ring supported in the device.

FIG. 4 is a top view of an illustrated embodiment with a piston ring 30 supported by base 10 and circular support 20. The entire support surface 12 in this illustrated embodiment is flat; however, other less preferred, non-planar shapes may also be utilized.

In use, a circular support 20 is placed on base 10 and a piston ring 30 is placed within the bore 25 and circumferentially supported by the interior support surface 24. The piston ring 30 is supported in a generally horizontal position by a portion of the support surface 12. The surface which the piston ring 30 is supported by is referred to herein as the "ring support surface," and should be flat. The ring support surface is illustrated as dotted circular lines on the support surface 12 in FIG. 1.

In addition to supporting the bottom of the piston ring, the base support surface 12 also supports at least a portion of the bottom of the circular support 12. The portion of the support surface which supports the circular support 12 is referred to herein as the "circular support support surface." In the illustrated embodiments, the circular support support surface is entirely flat, however, the entire circular support support surface need not be flat. Preferably, both the ring support surface and the circular support support surface are flat.

Figure 5:
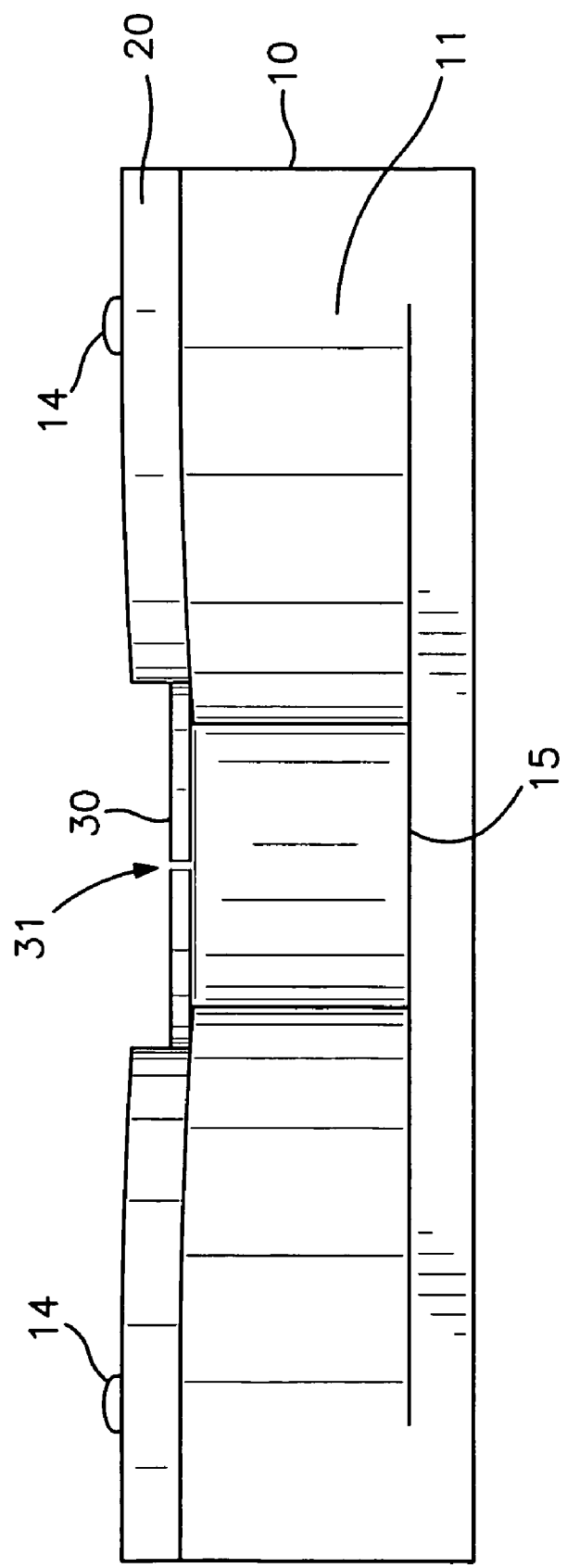
FIG. 5 is a front perspective view of the embodiment shown in FIG. 4 with a piston ring.

FIG. 5 is a front view of the illustrated embodiment wherein the circular support 20 is releasably secured to the base 10. A piston ring 30 is positioned within the bore 25 and is circumferentially supported by the interior support surface 24. The piston ring 30 is positioned in the bore 25 so that the piston ring gap 31 faces the front opening O and is between the forward edges 26A and 26B (see FIG. 3A) of the interior support surface 24. The piston ring is also supported by the ring support surface.

In this illustrated embodiment, the base 10 and the circular support 20 are both in the shape of a square; however, the base 10 and circular support 20 can be other shapes, e.g., circle, oval, rectangle, etc. The base 10 and the circular support 20 also do not need to be the same shape. The front portion of the circular support 20 also does not need to extend to the front edge of the front section 11. The illustrated device can be used with the bottom of the base positioned horizontally (lying flat), with the base positioned vertically (on any side), or at some other angle.

Another embodiment of the present invention is a kit useful for supporting piston rings of different sizes. FIGS. 3A-3C illustrate one such kit (and a piston ring 30) comprising three circular supports, two of which are not secured to a base, as illustrated in FIGS. 3A and 3B, and one circular support 20 secured to a base 10, as illustrated in FIG. 3C. Each of these illustrated circular supports have bores with different internal diameters. Another embodiment of the kit may include a greater or lesser number of circular supports and preferably at least one circular support having a bore with a different internal diameter than at least one other circular support. Another embodiment of the kit may include multiple circular supports having bores with the same internal diameter. Multiples of one particular size circular support may be provided in the kit when that size circular support is used frequently. As noted above, each of the circular supports may also have indicia to facilitate distinguishing between the different sizes.

Figure 6:
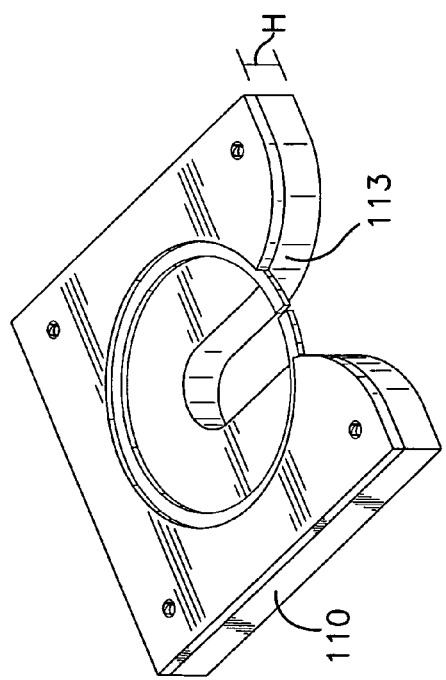
FIG. 6 is a perspective view of a second embodiment with a piston ring.

In an alternate embodiment shown in FIG. 6, the relieved section defined by sidewall 113 extends through the entire height H of the base 110. In this embodiment, the remaining elements of the support device are structurally and functionally the same as in the previously described embodiment.

Figure 7:
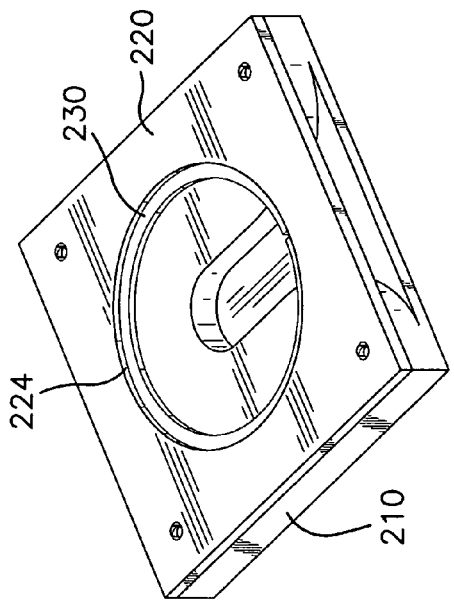
FIG. 7 is a perspective view of a third embodiment with a piston ring.

FIG. 7 illustrates another embodiment of the support device wherein circular support 220 does not have a front opening. In this embodiment, the interior support surface 224 entirely surrounds a piston ring 230 which rests on the ring support surface of base 210. As illustrated, base 210 preferably comprises a relieved section to facilitate manipulation and/or removal of the piston ring from the device.

Figure 8:
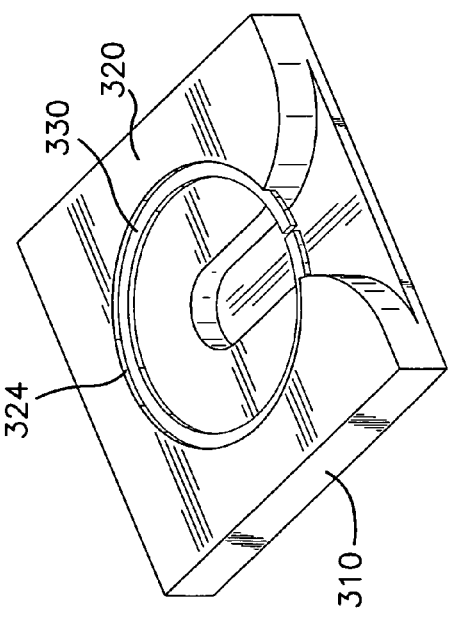
FIG. 8 is a perspective view of a fourth embodiment with a piston ring.

In another embodiment illustrated in FIG. 8, the support device comprises an integrally formed base portion 310 and circular support portion 320. Alternatively, the base and the circular support can be permanently or semi-permanently secured together so that they are not readily separable. Similar to the previously disclosed embodiments, the circular support 320 comprises an interior support surface 324 which circumferentially supports a piston ring 330. Multiple integrally formed units, each having a different internal bore diameter, can be provided separately or in a kit for measuring the gaps of different size piston rings.

As noted above, the internal diameter of the bore of the circular support corresponds to the internal diameter of the engine cylinder bore. If the internal diameter of available bore specification plates does not precisely match the desired bore diameter size, the device of the present invention may be utilized within limits since the size of the circumference is related to the diameter by π. Therefore, if the internal diameter of the bore increases by x inches, then the circumference of the bore increases by about πx inches. In a situation where there is a 0.001 inch overbore, then 0.003 inches should be added to the piston ring gap. An overbore is when the bore in the available bore specification plate is larger than the engine cylinder bore. Thus, while it is preferable to use a circular support which has the exact same size bore as the cylinder of the appropriate engine, in limited circumstances, it may be permissible to use a circular support which does not have the exact same size bore. For example, if the piston ring is going to be used in an engine cylinder which is slightly larger, e.g. about 0.001-0.002 inches, than the internal bore of the available circular support, then the person grinding the gap would grind a little less off the piston ring than he would have done if he had the exact size circular support available.

The invention claimed is:

1. A support device for a piston ring comprising:
    a base comprising a front section, a support surface, and a relieved section extending through at least a portion of said front section;
    a circular support comprising an interior support surface defining a bore, wherein said interior support surface is adapted to provide circumferential support to a piston ring; and
    means for releasably securing said circular support to said base.

2. A support device for a piston ring according to claim 1 wherein said interior support surface comprises two forward edges and a front opening defined by said forward edges.

3. A support device for a piston ring according to claim 2 wherein a portion of said front opening at least partially overlaps a portion of said relieved section when said circular support is releasably secured to said base.

4. A support device for a piston ring according to claim 2 wherein said front opening aligns with said relieved section when said circular support is releasably secured to said base.

5. A support device for a piston ring according to claim 1 wherein at least a portion of said support surface is flat.

6. A support device for a piston ring according to claim 1 wherein a portion of said support surface comprises a ring support surface and said ring support surface is flat.

7. A support device for a piston ring according to claim 6 wherein said support surface is an upper support surface.

8. A support device for a piston ring according to claim 6 wherein said ring support surface supports a piston ring in a generally horizontal position.

9. A support device for a piston ring according to claim 1 wherein a portion of said support surface comprises a circular support support surface and at least a portion of said circular support support surface is flat.

10. A support device for a piston ring according to claim 1 wherein said interior support surface extends circumferentially less than 360°.

11. A support device for a piston ring according to claim 1 wherein said interior support surface extends circumferentially about 285° to about 335°.

12. A support device for a piston ring according to claim 1 wherein said securing means comprises at least one pin.

13. A support device for a piston ring according to claim 1 wherein said securing means comprises at least one threaded connector.

14. A support device for a piston ring according to claim 11 wherein said at least one threaded connector comprises a screw.

15. A support device for a piston ring according to claim 1 wherein said securing means comprises a plurality of positioning pins connected to said base and a plurality of recesses in said circular support.

16. A support device for a piston ring according to claim 15 wherein said recesses comprise holes.

17. A support device for a piston ring according to claim 1 wherein said base comprises a height and said relieved section extends through at least a portion of said height.

18. A support device for a piston ring according to claim 1 wherein said base comprises a height and said relieved section extends through at least a majority of said height.

19. A support device for a piston ring according to claim 1 wherein said relieved section extends entirely through said height of said base.

20. A support device for a piston ring according to claim 1 wherein said front section comprises a width and said relieved section extends through at least a portion of said width.

21. A support device for a piston ring according to claim 1 wherein said relieved section is about 1 inch to about 2 inch wide.

22. A kit for supporting a piston ring:
    a base comprising a front section, a support surface, and a relieved section extending through at least a portion of said front portion;
    at least one circular support comprising an interior support surface defining a bore wherein said interior support surface is adapted to provide circumferential support to a piston ring; and means for releasably securing said at least one circular support to said base.

23. A kit supporting a piston ring according to claim 22 comprising a plurality of said circular supports.

24. A kit supporting a piston ring according to claim 23 wherein at least one of said circular supports comprises a bore with a different internal diameter than at least one other circular support.

25. A kit supporting a piston ring according to claim 24 comprising at least three circular supports comprising different internal diameters.

26. A kit supporting a piston ring according to claim 22 wherein said interior support surface comprising two forward edges and a front opening defined by said forward edges.

27. A kit supporting a piston ring according to claim 26 wherein a portion of said front opening at least partially overlaps a portion of said relieved section when said circular support is releasably secured to said base.

28. A support device for a piston ring comprising:
a base comprising a front section, a support surface, and a relieved section extending through at least a portion of said front section; and a circular support comprising an interior support surface defining a bore, wherein said interior support surface is adapted to provide circumferential support to a piston ring.

29. A support device for a piston ring according to claim 28 wherein said base and said circular support are integrally formed.

30. A support device for a piston ring according to claim 28 wherein said base and said circular support are permanently connected.

* * * * *